July 3, 1962     C. J. EVANS     3,041,752
MOUNTING MEANS FOR DIGGER TEETH
Filed June 16, 1959
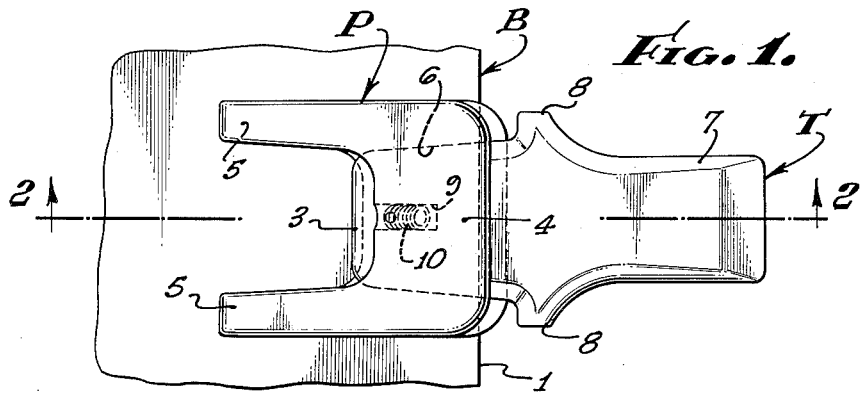
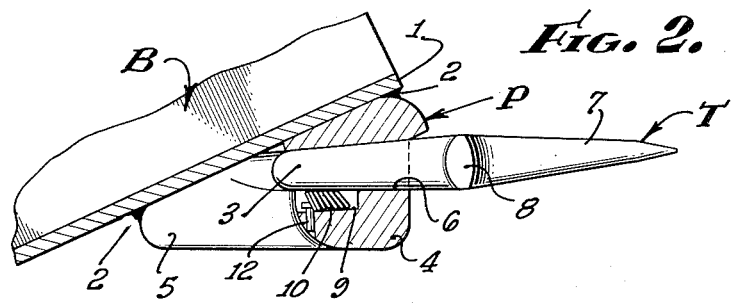
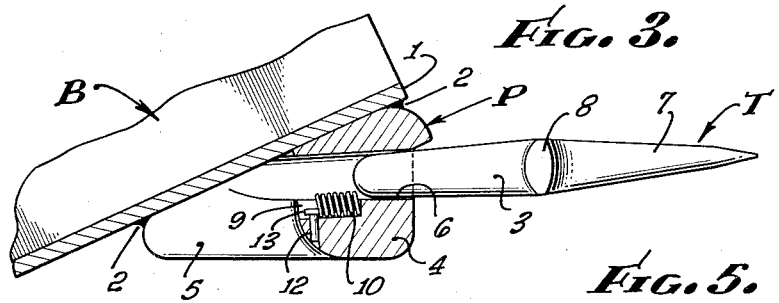
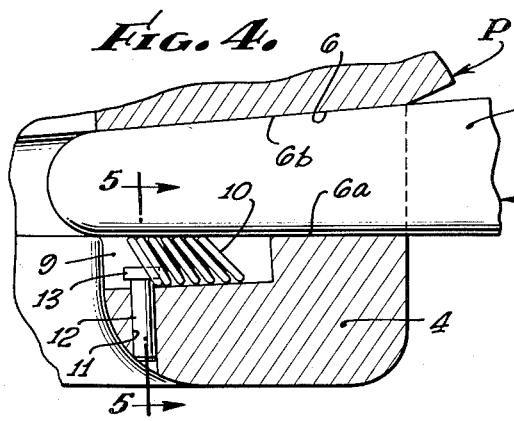
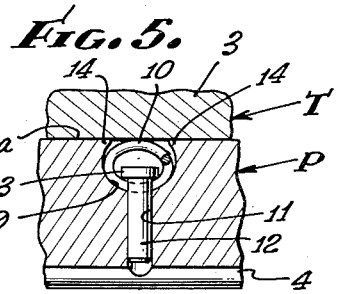
INVENTOR.
CLIFFORD J. EVANS
BY
Paul A. Weilein
ATTORNEY.

United States Patent Office 3,041,752
Patented July 3, 1962

3,041,752
MOUNTING MEANS FOR DIGGER TEETH
Clifford J. Evans, Pasadena, Calif., assignor to Jetco, Inc., Alhambra, Calif., a corporation of California
Filed June 16, 1959, Ser. No. 820,720
5 Claims. (Cl. 37—142)

The present invention relates to digger teeth of the type employed on earth working or excavating diggers such as trenchers, power shovels, clamshell buckets and the like.

In the trencher field, for example, it is the practice to provide on the buckets of trencher wheels replaceable teeth which may be substituted by new or reworked teeth when they become dull or excessively worn. Pockets have been provided on the digger wheel buckets for the reception of a tooth shank, the shank being releasably retained in the pocket in various manners. In addition, pocketed teeth have been retained on supporting shanks as by peening of the teeth into engagement with a projection on or into a recess in the supporting shank.

The present invention contemplates a novel retainer means for the digger tooth whereby the tooth may be easily mounted on or in a support on a bucket or the like, and will be automatically retained in place without requiring a separate operation to effect securement of the tooth. It will be recognized that automatic retention means for replaceable digger teeth affords substantial advantages in view of the frequency with which the teeth require changing, particularly when subjected to strenuous digging service through hard, rocky earth. In accordance with this objective, the tooth mounting may be characterized as including a supporting member and a tooth member, one of which members has a shank or projection and the other of which members has a cavity or pocket for reception of the shank, as is conventional, but wherein means are provided for automatically retaining the shank in the pocket.

An object of the invention is to provide automatic digger tooth retaining means wherein no special tooth supporting shank construction is required, so that the teeth may be readily manufactured.

A further object is to provide automatic digger tooth retainer means which is carried by the pocket in which the shank is disposed and which automatically engages the shank and retains the tooth against displacement during usage of the digger, but will permit the tooth to be forcibly removed with a hammer, for example.

Another object is to provide an automatic digger tooth retainer which is carried by the pocket for the tooth in a very simple manner so as to facilitate replacement of the retainer means upon replacement of the tooth if desired or required.

In accordance with the next preceding objective, it is a further object to provide an inexpensive and simple tooth retainer which may be readily replaced when changing digger teeth, with a minimum of trouble and expense.

Specifically, it is an object to provide automatic digger tooth retainer means disposed in the pocket of a digger bucket and operable to enable insertion of a tooth shank fully into the pocket, while acting as a wedge to prevent removal of the tooth.

Another object is to provide resilient means disposed in the tooth receiving pocket of a digger bucket or the like so as to engage the tooth shank and bias the latter into tight frictional engagement with an opposed face of the pocket.

Other objects and advantages of the invention will be hereinafter described or will become apparent to those skilled in the art, and the novel features of the invention will be defined in the appended claims.

In the drawings forming a part hereof, an illustrative embodiment of the invention is shown, reference to which in conjunction with the following specific description will lead to a more complete understanding of the invention:

FIG. 1 is a plan view of a digger tooth pocket having tooth retainer means in accordance with the invention and showing a digger tooth retained in the pocket;

FIG. 2 is a view in section along the line 2—2 of FIG. 1, but showing the tooth and the retainer means therefor in elevation;

FIG. 3 is a view generally corresponding to FIG. 2, but showing the tooth shank only partially disposed in the pocket;

FIG. 4 is an enlarged fragmentary view in section, showing the retaining means of the invention in greater detail and operatively engaged with a tooth shank; and FIG. 5 is a view in section as taken on the line 5—5 of FIG. 4.

Like reference characters in the several views of the drawings and in the following description designate corresponding parts.

In the drawings there is shown a fragmentary portion B of a bucket, such as a digger bucket of a trencher wheel, a power shovel bucket, or the like, having a digging edge 1. As is customary, a pocket forming member P is secured, preferably by welding as at 2, to the bucket B adjacent to the leading or digging edge 1, for the reception of the shank 3 of a digger tooth T.

The pocket forming member P, as shown, includes a body 4 having stabilizing wings or ribs 5 extending away from the leading or digging edge 1 of the bucket B. The body 4 is slotted as at 6 for the reception of the tooth shank 3. As best seen in FIGS. 1 and 4, the tooth shank 3 is tapered longitudinally and the slot 6 is correspondingly tapered for maximum face-to-face engagement of the shank 3 in the slot 6.

The tooth T is of a more or less conventional form, including a longitudinally tapered, comparatively sharp bit or working end 7 joined to the shank 3, there being lateral projections 8 at the juncture of the bit and shank ends of the tooth. It should be understood that the specific tooth configuration shown may be varied, as may be the pocket configuration, without departing from the spirit of the invention.

As best seen in FIGS. 4 and 5, the body 4 of the pocket member P is slotted as at 9, preferably as by boring on a center extending at a slight angle towards and beneath the plane of the bottom face 6a of the slot 6. Disposed in the bore or slot 9 is a section of a coiled spring 10 constituting wedge means for automatically engaging the bottom of the slot or bore 9 and the opposed face of the tooth shank 3 for retaining the tooth in the pocket member. In addition, it will be noted that the spring 10 constitutes means for resiliently biasing the upper face of the tooth shank 3 into tight frictional engagement with the top face 6b of the slot 6.

In order to retain the spring 10 in the slot or bore 9 against displacement longitudinally from within the slot or bore, the body 4 of the pocket member P is bored as at 11, so as to provide a socket extending downwardly from the base of the bore or slot 9 in which a retainer pin 12 is adapted to be retained. Preferably, the pin 12 is provided with a head 13 beneath which the adjacent coil of the spring 10 is adapted to be engaged. Moreover, it will be noted with particular reference to FIG. 5, that since the center of the bore or slot 9 is beneath the plane of the bottom surface 6a of the tooth shank retaining slot 6, overhanging edges 14 are provided whereby when the spring 10 is of a size closely approximating the diameter of the bore 9, the spring 10 will be precluded from displacement from the open side of the bore or slot 9 and must be removed endwise following removal of the retainer pin 12.

Referring to FIG. 3, it will be noted that when the shank 3 of the tooth T is being inserted into the shank receiving slot 6 of the pocket member P, the spring 10 is relaxed and is engaged at its opposite ends with the retainer pin 12 and with the end wall of the slot or bore 9, with the coils of the spring projecting into the shank receiving slot 6. As the shank 3 is moved further into the slot 6a, the coils of the spring 10 will be progressively crowded toward one another and flexed to the angular disposition shown in FIG. 4, wherein the coils constitute a series of angularly disposed wedging elements frictionally engaging the base of the slot or bore 9 and the opposing face of the tooth shank 3, while the resiliency of the spring acts to maintain the shank 3 in tight frictional engagement with the upper face 6b of the shank receiving slot 6. Any tendency of the tooth T to be removed from the slot 6 will result in an increased wedging action of the spring coil. Such wedging action is enhanced by the angular disposition of the slot or bore 9 as referred to above, whereby the bottom of the bore and the lower face of the shank 3 provide converging ramps engaged by said series of spring coils or wedging elements.

However, should it be desired to remove the tooth T from the socket member P, the inner extremity of the shank 3 may be struck with a hammer so as to overcome the holding effort of the spring 10 and forcibly drive the tooth from the pocket member.

From the foregoing it will be apparent that the present invention provides a novel means for effectively automatically retaining in place a replaceable digger tooth while enabling replacement of the tooth following damage or wear of the latter to such an extent as would render replacement desirable. In addition, the retainer means itself is of an extremely simple and inexpensive construction which may also be readily replaced upon removal of the tooth T from the supporting pocket.

While specific structural details have been shown and described, it should be understood that changes and alterations may be resorted to without departing from the spirit of the invention as defined in the appended claims.

I claim:

1. A digger tooth mounting comprising: a supporting member having a pocket for the reception of a tooth shank; said pocket having opposed surfaces engageable with said shank while said shank is positioned in said pocket; said supporting member having an elongated slot opening along one side into said pocket; a coiled spring disposed in said slot with its coils projecting into said pocket from the open side of said slot; said slot being open at the end thereof farthest removed from the mouth of said pocket; and a retainer pin removably carried by said member in the open end of said slot for preventing displacement of said coiled spring therefrom.

2. In combination: a digger bucket or the like having a digging edge; an adaptor body mounted thereon adjacent said digging edge for receiving the shank of a digger tooth; said body having a pocket for receiving the shank of said digger tooth; said pocket having opposed surfaces engageable with the shank of said tooth upon insertion of the shank into said pocket; said body having in one of said surfaces a narrow slot opening into said shank receiving pocket; said slot being of materially less width than said one surface; and a coiled spring disposed in said slot with portions of its convolutions extending into said pocket to be engaged and distorted by said shank to thereby hold said shank in said pocket.

3. The combination defined in claim 2 including a digger tooth having a shank portion, complementary in shape to said pocket and having faces in surface contact with said opposed surfaces.

4. The combination defined in claim 2 wherein said slot is provided with a bottom longitudinal surface extending at an angle to said one surface whereby one portion of said spring will be distorted more than another portion.

5. The combination defined in claim 2 wherein said pocket has an open entrance end and wherein the end of said slot nearest said entrance end is shallower in depth than the other end thereof.

References Cited in the file of this patent

UNITED STATES PATENTS

| | | |
|---|---|---|
| 982,829 | Kemish | Jan. 31, 1911 |
| 1,054,706 | Merrill | Mar. 4, 1913 |
| 1,727,108 | Julius | Sept. 3, 1929 |
| 1,816,710 | Young | July 28, 1931 |
| 2,145,663 | Reynolds | Jan. 21, 1939 |
| 2,576,225 | Hostetter | Nov. 27, 1951 |
| 2,610,417 | Crawford | Sept. 16, 1952 |
| 2,618,873 | Hostetter | Nov. 25, 1952 |
| 2,635,366 | Hostetter | Apr. 21, 1953 |
| 2,852,874 | Grubb | Sept. 23, 1958 |
| 2,861,362 | Liard et al. | Nov. 25, 1958 |

FOREIGN PATENTS

| | | |
|---|---|---|
| 1,150,034 | France | July 29, 1957 |